United States Patent
Leyk et al.

(10) Patent No.: US 7,633,275 B2
(45) Date of Patent: Dec. 15, 2009

(54) CYCLICAL DC VOLTAGE CONVERTER FOR SUPPRESSING VOLTAGE SPIKES AND OSCILLATIONS

(75) Inventors: Andreas Leyk, Dinslaken (DE); Christian Kranz, Ratingen Lintorf (DE)

(73) Assignee: Infineon Technologies AG, Munich (DE)

( * ) Notice: Subject to any disclaimer, the term of this patent is extended or adjusted under 35 U.S.C. 154(b) by 535 days.

(21) Appl. No.: 11/168,153

(22) Filed: Jun. 28, 2005

(65) Prior Publication Data
US 2006/0017490 A1   Jan. 26, 2006

(30) Foreign Application Priority Data
Jun. 29, 2004 (DE) .................. 10 2004 031 395

(51) Int. Cl.
G05F 3/16 (2006.01)
(52) U.S. Cl. .................. 323/224; 323/283; 323/284
(58) Field of Classification Search .................. 323/222, 323/224, 271, 283, 284, 285, 247, 265
See application file for complete search history.

(56) References Cited

U.S. PATENT DOCUMENTS

| | | | |
|---|---|---|---|
| 3,531,712 A | | 9/1970 | Cecchini |
| 5,254,937 A | * | 10/1993 | Mizoguchi .................. 323/283 |
| 5,751,139 A | | 5/1998 | Jordan et al. |
| 6,038,153 A | * | 3/2000 | Andersson et al. ............ 363/97 |
| 6,166,528 A | * | 12/2000 | Rossetti et al. .............. 323/283 |
| 6,232,752 B1 | * | 5/2001 | Bissell ....................... 323/225 |
| 6,366,070 B1 | | 4/2002 | Cooke et al. |
| 6,894,471 B2 | * | 5/2005 | Corva et al. .................. 323/282 |
| 6,906,536 B2 | * | 6/2005 | Pearce et al. ................. 324/713 |
| 6,922,322 B2 | * | 7/2005 | Strayer et al. ............... 361/111 |
| 6,995,965 B2 | * | 2/2006 | Hameed et al. ............ 361/91.1 |
| 2004/0085048 A1 | * | 5/2004 | Tateishi ....................... 323/224 |
| 2004/0109273 A1 | * | 6/2004 | Honda et al. .................. 361/90 |
| 2004/0119447 A1 | * | 6/2004 | Kato ........................... 323/222 |
| 2005/0259373 A1 | * | 11/2005 | Hoopes ....................... 361/90 |

FOREIGN PATENT DOCUMENTS

DE    103 34 598 A1    2/2005

* cited by examiner

*Primary Examiner*—Edward Tso
*Assistant Examiner*—Arun Williams
(74) *Attorney, Agent, or Firm*—Eschweiler & Associates, LLC

(57) ABSTRACT

A DC voltage converter is provided that cyclically converts an input-side supply voltage into an output voltage. The converter includes an inductive storage element connected between a terminal for the supply voltage and, in a manner such that it is coupled via a first switch, a reference potential terminal. The capacitively buffered output voltage terminal is connected, via a second switch, between the inductive storage element and the first switch. Provision is furthermore made of a third switch, which is intended to selectively short the inductive storage element that is connected in parallel and is controlled by a control circuit. The control circuit is controlled, on the input side, by a control voltage that is tapped off at the second terminal of the inductive storage element.

19 Claims, 3 Drawing Sheets

CYCLICAL DC VOLTAGE CONVERTER FOR SUPPRESSING VOLTAGE SPIKES AND OSCILLATIONS

REFERENCE TO RELATED APPLICATIONS

This application claims the benefit of the priority date of German application DE 10 2004 031 395.4, filed on Jun. 29, 2004, the contents of which are herein incorporated by reference in their entirety.

FIELD OF THE INVENTION

The present invention relates to a DC voltage converter, which is operated cyclically with an inductive storage element that can be shorted by means of a suitable control circuit in order to suppress voltage spikes and voltage oscillations which occur during operation.

BACKGROUND OF THE INVENTION

DC voltage converters are used in portable devices in which the batteries provide only a low supply voltage on account of the desired miniaturization and weight saving. In order to supply the circuit units of the devices, a DC voltage converter converts the supply voltage into a higher output voltage. The design of such a DC voltage converter (which is also referred to as a step-up converter) is described in Tietze/Schenk: "Halbleiterschaltungstechnik" [Semiconductor circuit technology], 12th edition, pages 948 to 949.

A DC voltage converter has an inductive storage element, which is connected between a terminal for the supply voltage and, in such a manner that it is coupled via a first switch, a terminal for the reference potential. A capacitively buffered terminal for the output voltage is connected, via a second switch, between the inductive storage element and the first switch.

During ideal cyclic operation, the first switch and the second switch change over simultaneously, with the result that either the first switch is on and the second switch is off or the first switch is off and the second switch is on, respectively. If the first switch is on, energy is stored in the inductive storage element. The charge is removed if the second switch is on, and the capacitor is charged. If the switching states of the first and second switches remain unchanged, the coil current falls continuously until the inductive storage element has been discharged.

If the first and second switches are on, the energy stored in the capacitor drains via the second and first switches. This impairs the efficiency of the DC voltage converter.

If the first and second switches are off at the same time and energy is still stored in the inductive storage element, the coil current is interrupted and voltage spikes which may damage the circuit occur. In addition, interfering oscillations occur, said oscillations being caused by the resultant resonant circuit that is formed from the inductive storage element and the parasitic switch capacitance.

In practice, the first and second switches cannot be changed over at exactly the same time on account of propagation times and other effects. Therefore, it is difficult to avoid the first and second switches being off at the same time. The first and second switches may likewise be on at the same time. This state is usually avoided on account of the efficiency being greatly reduced. In addition, it is also sometimes desired, when regulating the circuit, that the first and second switches are off at the same time so that the output voltage assumes a prescribed value. In order to suppress the associated voltage spikes or voltage oscillations, the inductive storage element is shorted, with the result that the coil current flows in the short-circuit circuit. Such a circuit is also referred to as a snubber circuit. A snubber circuit has hitherto usually been formed by a series circuit comprising a diode and a series resistor, said series circuit being connected in parallel with the inductive storage element. The series resistor is used to set a voltage value, at which the inductive storage element is shorted. The voltage value may not be less than the threshold voltage of the diode, which, in integrated circuits, is possibly already a critical value.

The problem is that both the diode and the resistor must be dimensioned as accurately as possible (which is associated with outlay in terms of technology and costs) so that, on the one hand, the inductive storage element is shorted at a desired threshold value and, on the other hand, the losses on account of the voltage drop across the resistor are not too large.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

The invention is directed to a DC voltage converter whose inductive storage element is shorted by an individual switch having a suitable control circuit if voltage spikes or voltage oscillations occur, wherein the switch is implemented in a simple manner and generates few losses.

According to one embodiment of the invention, a DC voltage converter is disclosed that cyclically converts an input-side supply voltage into an output voltage. The converter comprises an inductive storage element having a first terminal and a second terminal, the first terminal of which is connected to a supply voltage terminal.

The converter also includes a first switch which has a first terminal and a second terminal and is connected in series with the inductive storage element, wherein the first terminal of the first switch is connected to the second terminal of the inductive storage element and the second terminal of the first switch is connected to a reference potential terminal.

The converter further comprises a second switch having a first terminal and a second terminal, wherein the first terminal thereof is connected to the second terminal of the inductive storage element and the second terminal is connected to an output voltage terminal.

In addition, a capacitive storage element is provided, which is connected between the output voltage terminal and the reference potential terminal. Lastly, a third switch is provided, which is configured to short the inductive storage element, is connected in parallel with the inductive storage element and is connected to a control circuit, which can be controlled, on the input side, by a control voltage that is tapped off at the second terminal of the inductive storage element.

In the DC voltage converter according to one embodiment of the invention, the inductive storage element is shorted by the activatable third switch if the control circuit detects voltage spikes or voltage oscillations. This feature has the advantage that the third switch has only low power losses and both the third switch and the components of the control circuit can be formed in an inexpensive and simple manner using integrated circuit technology.

One additional embodiment of the control circuit comprises a threshold value decision unit, to which the control voltage is applied on the input side, and a downstream storage element whose output-side storage signal is coupled to a control terminal of the third switch. This embodiment has the advantage that it comprises only two essential standard components which can be formed in an inexpensive and simple manner using integrated circuit technology.

Another embodiment of the invention comprises the provision of a regulating circuit, to which the output voltage is applied on the input side and which provides a first switching signal and a second switching signal on the output side so that the output voltage assumes a prescribed value. This means that the prescribed output voltage is provided even when the load is changed.

In one example the first and second switching signals are provided so that the first switch and the second switch are on in the push-pull mode or are off in the push-pull mode. This corresponds to ideal high-efficiency operation of the DC voltage converter.

In another example the first switch is in the form of an n-channel field effect transistor and the second switch is in the form of a p-channel field effect transistor or the first switch is in the form of a p-channel field effect transistor and the second switch is in the form of an n-channel field effect transistor, and the first switching signal and the second switching signal are in phase or are virtually in phase, with the result that both switches can also be driven using the same signal.

In a DC voltage converter whose first switch and whose second switch are in the form of n-channel field effect transistors or whose first switch and whose second switch are in the form of p-channel field effect transistors, the first switching signal and the second switching signal are in antiphase or are virtually in antiphase. This has the advantage that only one type of switch is used.

In an alternative embodiment, the second switch of the DC voltage converter is in the form of a diode, as shown in FIG. 3. In this case, the regulating circuit provides only the first control signal.

In the control circuit, a threshold value decision unit assigns one of two logic states to an output-side signal. A first logic state is assumed if an internal threshold value that is greater than a prescribed output voltage is exceeded, and a second logic state is otherwise assumed. This is expedient in order to detect voltage spikes which occur.

In an alternative embodiment of the threshold value decision unit, the threshold value may be selected in such a manner that undershoots originating from the resonant circuit which may occur are detected.

In one embodiment, the threshold value decision unit has two internal threshold values, a first threshold value for changing over from the first to the second state, by switching hysteresis, and a second threshold value for changing over from the second to the first state. This aspect may also be referred to as a Schmitt trigger and can be implemented in a particularly simple manner.

The storage element used in the control circuit in one example has a set input, which is coupled to the output of the threshold value decision unit, a reset input and an output, the reset input being coupled to the first switching signal in such a manner that one of the logic states is applied to the storage element on the output side if the first switch is on and another logic state is applied on the output side as soon as a clock edge appears at the set input if the first switch is off. The occurrence of a first overshoot or undershoot is indicated by changing the initial state. This initial state remains unchanged if the first switch is off. The output signal is advantageously coupled to the third switch that shorts, with the result that the inductive storage element is shorted when voltage oscillations occur.

In one embodiment, the output of the storage element is coupled to the third switch via an inverter. The inverter comprises a driver inverter that switches quickly as regards the gate capacitance (the charge of which is to be reversed) of the third switch.

In accordance with another embodiment, the storage element comprises a D-type flip-flop whose integration is sufficiently well known.

In one embodiment of the control circuit, provision is made of a first inverter, which is connected upstream of the reset input of the storage element, with the result that the storage element is reset if the first switch is on.

The threshold value decision unit may be provided with a supply input. The storage element may be formed such that it has a further input, which, for example in the case of the D-type flip-flop, is used to assign a value to one of the logic states.

The third switch may comprise an n-channel field effect transistor or p-channel field effect transistor. This results in degrees of freedom when designing the circuit.

In another example the DC voltage converter is designed using integrated circuit technology. The further miniaturization of devices is thus supported.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The invention is explained below with reference to the drawing, in which.

DETAILED DESCRIPTION OF THE DRAWINGS

Figure 1:
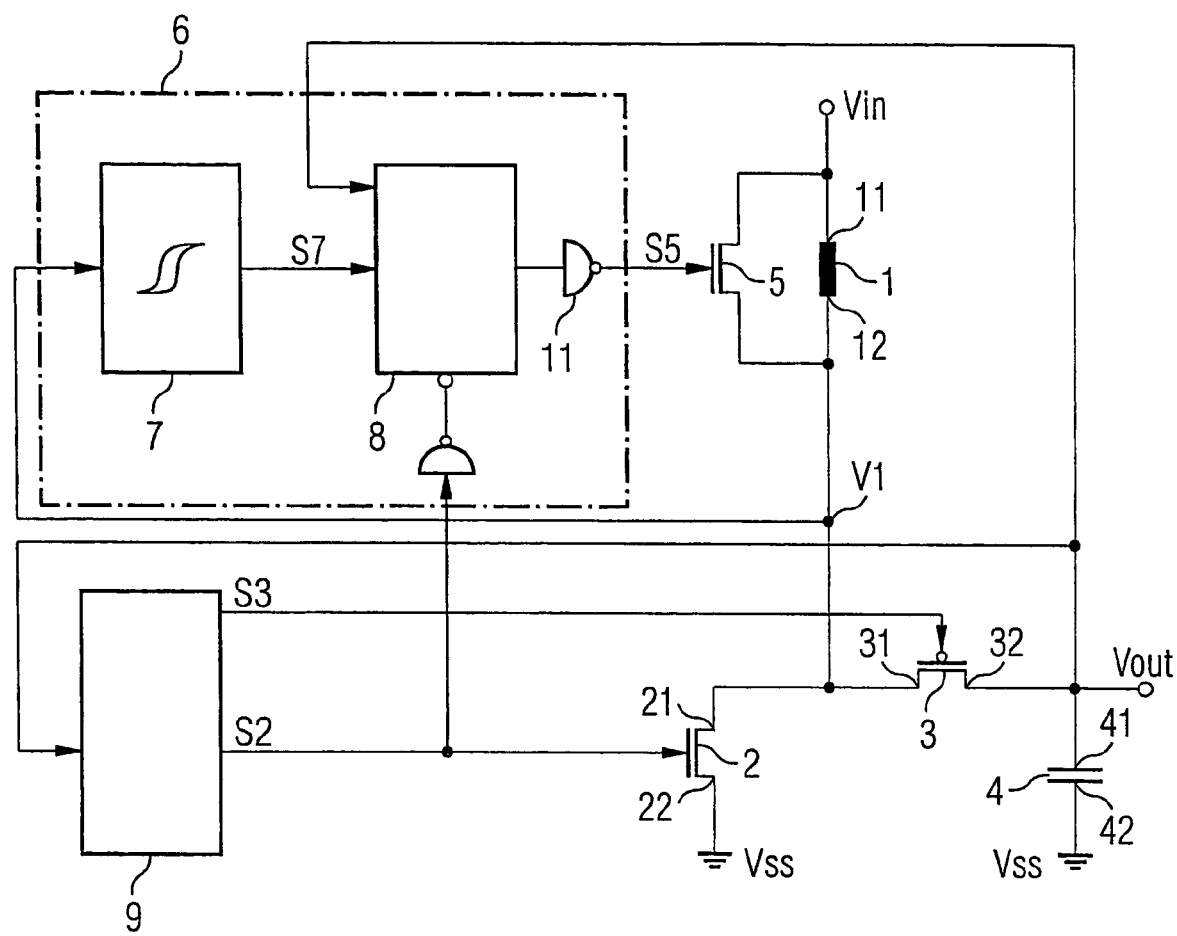
FIG. 1 is a block level diagram illustrating one exemplary embodiment of the invention.

FIG. 1 shows one exemplary embodiment of the invention, which is operable to convert a supply voltage Vin (which is applied initially) into an output DC voltage Vout. An inductive storage element 1 having a first terminal 11 and a second terminal 12 is coupled, by way of the first terminal 11, to a terminal for providing the supply voltage Vin and is connected, by way of the second terminal 12, to a reference potential Vss via a switch 2. A second switch 3 having a first terminal 31 and a second terminal 32 is connected, via the first terminal 31, to the second terminal 12 of the inductive storage element 1. The second terminal 32 of the second switch 3 is connected to a terminal for tapping off the output voltage Vout. A capacitor 4 is connected between the terminal for tapping off the output voltage Vout and the reference potential Vss. A third switch 5 for shorting the inductive storage element 1 is connected in parallel with the latter. The third switch 5 can be switched using a control circuit 6 whose input-side control voltage V1 is tapped off at the second terminal 12 of the inductive storage element 1.

The control circuit 6 comprises a threshold value decision unit 7, which has a storage element 8 connected downstream of it, the output of said storage element being coupled to the control input of the third switch 5. As shown in FIG. 1, a second inverter 11 is provided for coupling purposes. The inverter may also be in the form of a fast-switching driver inverter. As an alternative, it is also possible, for example, to couple directly or via an amplifier. The threshold value decision unit 7 is formed in such a manner that a first state is applied to the output of the threshold value decision unit 7 if the input signal exceeds an internal threshold and in such a manner that a second state of the threshold value decision unit output is otherwise applied.

An alternative embodiment of the threshold value decision unit 7, which may be, for example, a Schmitt trigger, has two internal threshold values, a first threshold value for changing over from the first to the second state being distinguished, by switching hysteresis, from a second threshold value for changing over from the second to the first state.

The storage element 8 has a set input, a reset input, and an output, and is driven, using the first switching signal S2, in such a manner that one logic state is applied to the output side if the first switch 2 is on and in such a manner that another logic state is applied to the output side if a clock edge appears at the set input and the first switch 2 is off. In FIG. 1, a first inverter 10 is provided for the purpose of coupling the reset input to the first switching signal S2.

One advantageous exemplary implementation of the storage element 8 is a D-type flip-flop whose initial state is reset if no voltage is applied to the reset input, as illustrated by way of example in FIG. 1. This embodiment allows the circuit to be started up in a stable manner.

The threshold value decision unit may be provided with a supply input. The storage element may be formed such that it has a further input, which, for example in the case of the D-type flip-flop, is used to assign a value to one of the logic states. This input, in one example, is connected to the output voltage Vout. As shown in FIG. 1, the threshold value decision unit 7 is formed, by way of example, without a supply input and the storage element 8 is formed such that it has a further input.

In addition, provision is made of a regulating circuit 9 whose function is to ensure that the output voltage Vout assumes a prescribed value. The output voltage Vout is applied to the regulating circuit 9 on the input side and a first switching signal S2 for controlling the first switch 2 and a second switching signal S3 for controlling the second switch 3 are provided on the output side.

The first switching signal S2 and the second switching signal S3 are ideally selected in such a manner that the first switch 2 is on and the second switch 3 is off or the first switch 2 is off and the second switch 3 is on. Suitable embodiments of the switches are n-channel field effect transistors or p-channel field effect transistors. In FIG. 1, the first switch 2 is, for example, in the form of an n-channel field effect transistor and the second switch 3 is, for example, in the form of a p-channel field effect transistor. In this case, the first switching signal S2 and the second switching signal S3 are in phase or are virtually in phase. This means, for example, that the first switching signal S2 and the second switching signal S3 simultaneously have a high signal level and simultaneously have a low signal level. It is likewise conceivable for the first switch 2 to be in the form of a p-channel field effect transistor or for the second switch 3 to be in the form of an n-channel field effect transistor.

In order to describe the method of operation of the control circuit 6, the first switching signal S2 and the second switching signal S3 are, for example, selected in such a manner that three phases occur during circuit operation:

in phase I, the first switch 2 is on and the second switch 3 is off, in phase II, the first switch 2 is off and the second switch 3 is on, and in phase III, both the first switch 2 and the second switch 3 are off.

In addition, another phase IV is possible, in which both the first switch 2 and the second switch 3 are on. Phase I, in which the inductive storage element 1 is charged, and phase II, in which the capacitor 4 is charged, are essential to operation of the DC voltage converter. Voltage spikes and voltage oscillations which are attenuated by using the control circuit 6 may occur during phase III. During phase IV, the capacitor is discharged via the second switch 3 and the first switch 2, thus impairing the efficiency but not resulting in voltage spikes or voltage oscillations which could be attenuated by the control circuit 6. This situation is therefore not considered in any more detail.

Figure 2:
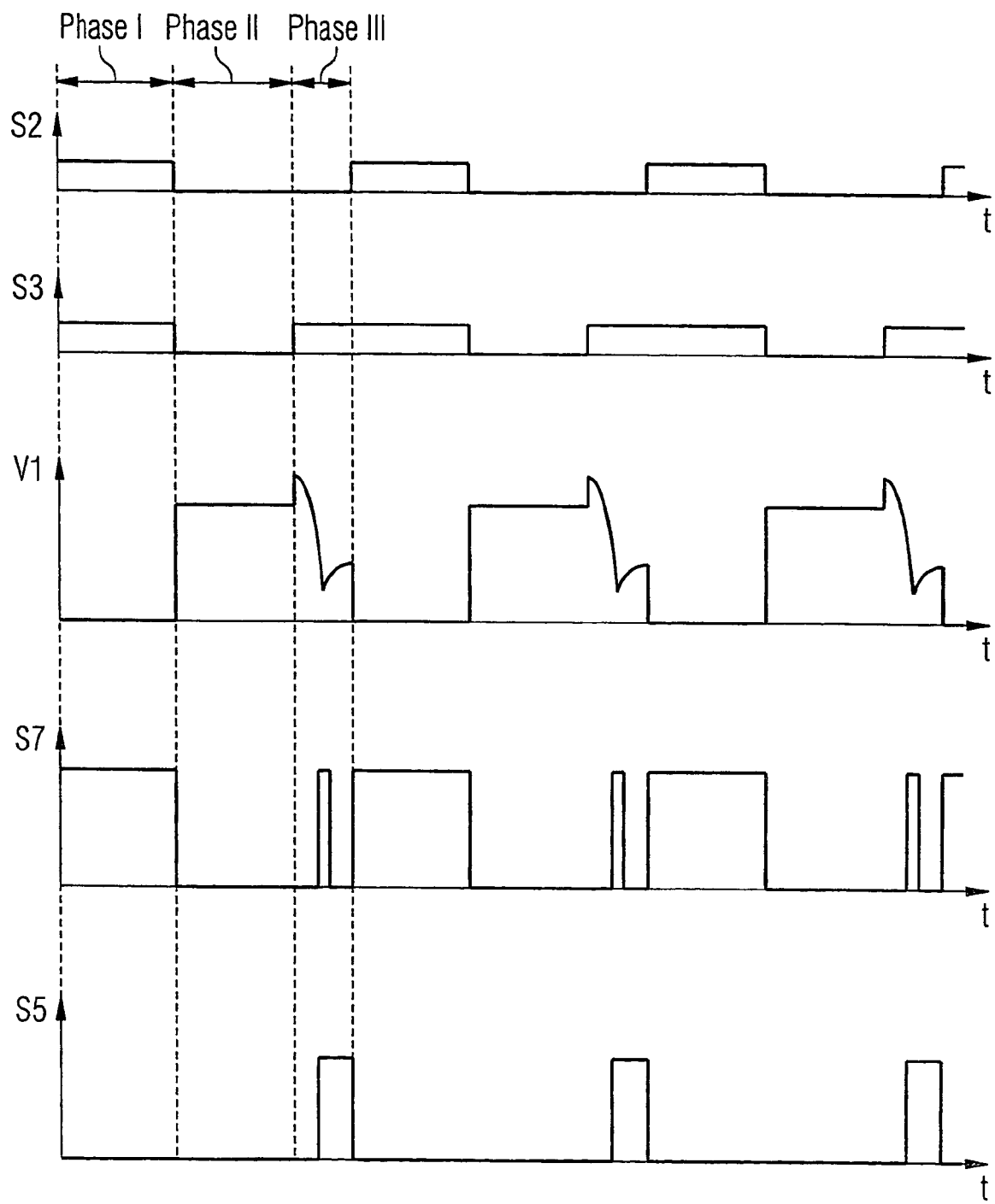
FIG. 2 is a combined timing and state diagram illustrating the time profile of selected signals.
Figure 3:
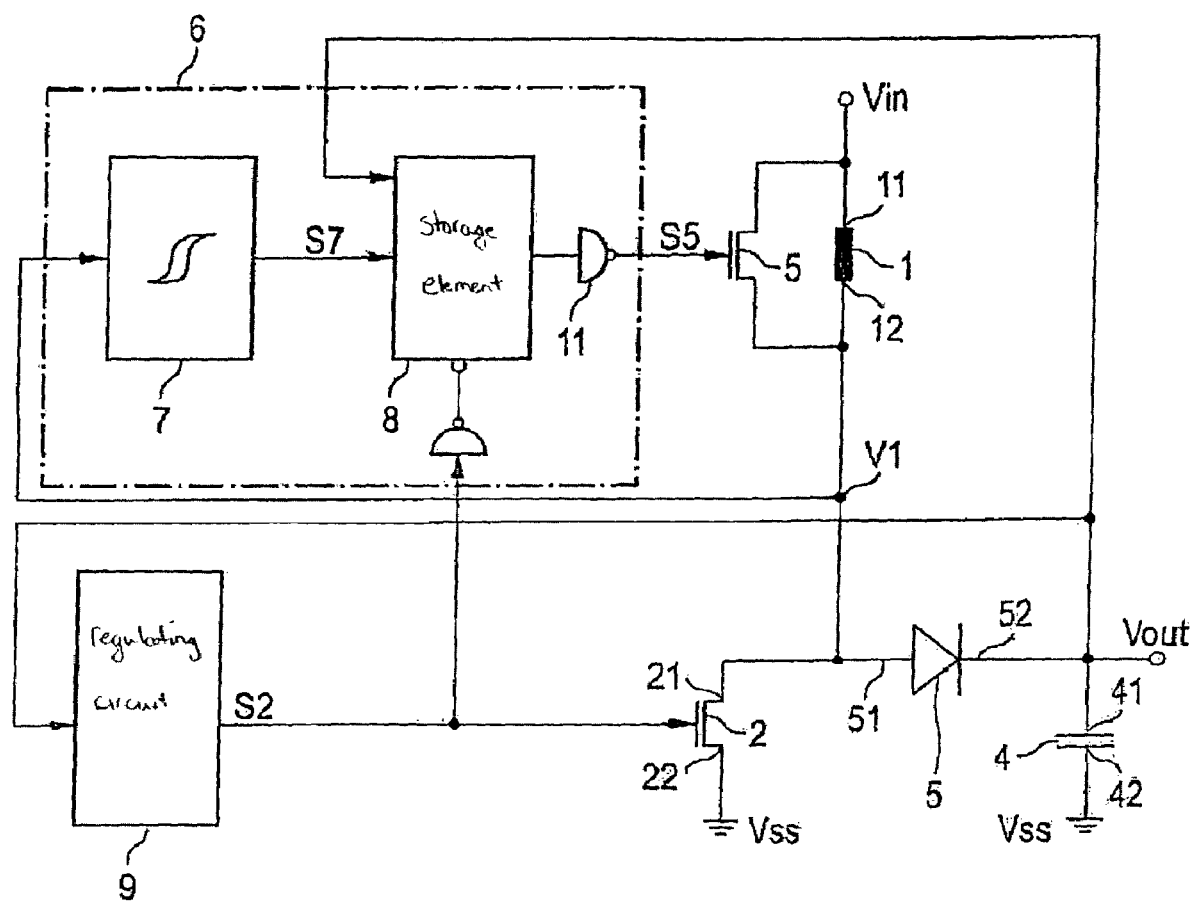
FIG. 3 is a block level diagram illustrating an alternative exemplary embodiment of the Invention.

FIG. 2 uses a state diagram to illustrate the temporal change in selected time signals. The first switching signal S2, the second switching signal S3, the control voltage V1, the output signal S7 of the threshold value element 7 and the third switching signal S5 that is linked to the output of the storage element 8 are illustrated.

The first switching signal S2 cyclically changes its state. It is coupled to the first switch 2 in such a manner that, in the case of a low level, the first switch 2 is off and, in the case of a high level, the first switch 2 is on. The same assignment of the levels determines the switching state of the third switch 5. The second switching signal S3 is coupled to the second switch 3 in such a manner that, in the case of a low level, the second switch 3 is on and, in the case of a high level, the second switch 3 is off.

In phase I, the inductive storage element 1 is charged by a current via the terminal for the supply voltage Vin. The control voltage V1 that is applied to the input of the control circuit 6 is at reference potential Vss. The output signal S7 of the threshold value decision unit 7 is set to a first logic state of the threshold value decision unit output. The reset input of the storage element 8 is coupled to the first switching signal S2 in such a manner that a first logic state of the storage element output is applied. It should be noted that the first logic state of the threshold value decision unit output does not have to have the same value as the first logic state of the storage element output.

The output of the storage element 8 is coupled to the third switch 5 in such a manner that the latter is off during the first logic state of the storage element output.

In phase II, a discharging current of the inductive storage element 1 flows via the second switch 3 and the capacitor 4 is charged. The control voltage V1 is at approximately the same potential as the output voltage Vout.

The internal threshold value of the threshold value decision unit 7 is set in such a manner that either overshoots or undershoots of the control voltage V1 are detected. If the threshold value is set to detect overshoots, the first state of the threshold value decision unit output is applied. If the threshold value is set to detect undershoots, a second logic state of the threshold value decision unit output is applied. In this exemplary embodiment, the threshold value decision unit is designed in such a manner that its output is inverting and its internal threshold is set to detect undershoots. In this case, in phase II, the output signal S7 is in the second state of the threshold value decision unit output.

The output of the storage element 8, like the third switching signal S5, remains unchanged since the first switch 2 is off and no clock edge appears on the input side. The third switch 5 remains off.

If, in phase III, energy is still stored in the inductive storage element 1, the flow of current is interrupted if the first switch 2 and the second switch 3 are simultaneously off. The control voltage V1 would have voltage spikes and voltage oscillations if it were not attenuated by shorting (in accordance with the invention) the coil current when a first overshoot or undershoot occurred.

When an overshoot of the control voltage V1 occurs, the second state of the threshold value decision unit 7 is applied to the output of the latter if the internal threshold value has been set to detect overshoots. When an undershoot of the control voltage V1 occurs, the first state of the threshold value decision unit 7 is applied to the output of the latter if the internal threshold value has been set to detect undershoots.

In FIG. 2, the control voltage V1 first of all rises and then falls in phase III. When the internal threshold for detecting undershoots is undershot, the output signal S7 of the threshold value decision unit 7 changes to the first state.

When a detected overshoot or a detected undershoot occurs, the output-side state of the storage element 8 changes since the first switch 2 is off and a signal edge occurs on the input side. The output-side state of the storage element 8 remains in this state since further clock edges do not change the state if the first switch 2 is off. Consequently, the third switching signal S5 has a high level and the third switch 5 is on. As a result, the inductive storage element 1 is shorted, with the result that further oscillations of the control voltage V1 are suppressed and the control voltage V1 is forced to the potential of the supply voltage Vin.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A DC voltage converter, which cyclically converts an input-side supply voltage into an output voltage, comprising:
  an inductive storage element comprising a first terminal and a second terminal, wherein the first terminal is coupled to a supply voltage terminal;
  a first switch comprising a first terminal and a second terminal, and coupled in series with the inductive storage element, wherein the first terminal of the first switch is coupled to the second terminal of the inductive storage element and the second terminal of the first switch is coupled to a reference potential terminal;
  a second switch comprising a first terminal and a second terminal, wherein the first terminal thereof is coupled to the second terminal of the inductive storage element and the second terminal thereof is coupled to an output terminal at which an output voltage is provided;
  a capacitive storage element coupled between the output terminal and the reference potential terminal; and
  a third switch configured to selectively short the inductive storage element, and coupled in parallel with the inductive storage element, and configured to be controlled by a control circuit that is configured to generate a control signal based on a control voltage tapped off at the second terminal of the inductive storage element, the control circuit comprising a threshold value decision unit to which the control voltage is applied on an input side thereof, and a downstream storage element configured to output the control signal to a control terminal of the third switch.

2. The DC voltage converter of claim 1, wherein the first switch is configured to switch cyclically in response to a first switching signal, and the second switch is configured to switch cyclically in response to a second switching signal.

3. The DC voltage converter of claim 1, further comprising a regulating circuit configured to receive the output voltage and generate the first switching signal and the second switching signal in response thereto so that the output voltage assumes a prescribed value.

4. The DC voltage converter of claim 1, wherein the regulating circuit generates the first switching signal and the second switching signal such that the first switch and the second switch are on in a push-pull mode or are off in the push-pull mode.

5. The DC voltage converter of claim 4, wherein the first switch comprises an n-channel field effect transistor and the second switch comprises a p-channel field effect transistor, or the first switch comprises a p-channel field effect transistor and the second switch comprises an n-channel field effect transistor, and wherein the first switching signal and the second switching signal are in phase or are substantially in phase.

6. The DC voltage converter of claim 4, wherein both the first switch and the second switch comprise n-channel field effect transistors or p-channel field effect transistors, respectively, and wherein the first switching signal and the second switching signal are in antiphase or are substantially in antiphase.

7. The DC voltage converter of claim 1, wherein the threshold value decision unit is configured to assign one of two logic states to an output-side signal provided to the downstream storage element, wherein a first logic state is provided if an internal threshold value for detecting overshoots is exceeded and a second logic state is provided otherwise.

8. The DC voltage converter of claim 1, wherein the threshold value decision unit is configured to assign one of the two logic states to an output-side signal, wherein a first logic state is provided if an internal threshold value for detecting undershoots is undershot and a second logic state is provided otherwise.

9. The DC voltage converter of claim 7, wherein the threshold value decision unit comprises two internal threshold values associated therewith, wherein a first threshold value for changing over from the first to the second state is distinguished, by switching hysteresis, from a second threshold value for changing over from the second to the first state.

10. The DC voltage converter of claim 1, further comprising a downstream storage element, wherein the downstream storage element comprises a set input coupled to an output of the threshold value decision unit, a reset input and an output, wherein the reset input is coupled to the first switching signal such that one of the logic states is applied to the storage element on the output side thereof if the first switch is on and another logic state is applied on the output side as soon as a clock edge appears at the set input if the first switch is off.

11. The DC voltage converter of claim 10, further comprising a first inverter coupled upstream of the reset input of the downstream storage element, and configured to reset the storage element if the first switch is on.

12. The DC voltage converter of claim 11, wherein the output of the storage element is coupled to the third switch and is configured to turn on the third switch in response to a clock edge appearing at the set input of the storage element and the first switch being off.

13. The DC voltage converter of claim 10, further comprising a second inverter coupled downstream of the storage element and configured to drive the third switch, wherein the third switch is on if a clock edge appears at the set input of the storage element and the first switch is off.

14. The DC voltage converter of claim 1, wherein the downstream storage element comprises a D-type flip-flop and has a further input configured to assign a value to one of the logic states, and wherein the input is coupled to the output voltage terminal.

15. The DC voltage converter of claim 1, wherein the third switch comprises an n-channel field effect transistor or a p-channel field effect transistor.

16. The DC voltage converter of claim 1, wherein the second switch comprises a diode having an anode coupled to the second terminal of the inductive storage element and a cathode coupled to the output voltage terminal.

17. The DC voltage converter of claim 1, wherein the threshold value decision unit and the storage element each have a supply terminal coupled to the output voltage terminal.

18. The DC voltage converter of claim 1, wherein the second terminal of the second switch is directly coupled to the output terminal at which an output voltage is provided.

19. The DC voltage converter of claim 1, wherein the third switch is configured to provide a shorting path from the supply voltage terminal to the first terminal of the first switch and the first terminal of the second switch, wherein the shorting path bypasses all inductive elements between the supply voltage terminal and the first and second switches.

* * * * *